(12) United States Patent
Manousiouthakis et al.

(10) Patent No.: US 7,960,063 B2
(45) Date of Patent: Jun. 14, 2011

(54) HYDROGEN PRODUCTION BY A THERMOCHEMICAL WATER SPLITTING CYCLE

(75) Inventors: Vasilios Manousiouthakis, Los Angeles, CA (US); Ioannis Manousiouthakis, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 314 days.

(21) Appl. No.: 11/745,256

(22) Filed: May 7, 2007

(65) Prior Publication Data

US 2007/0289863 A1 Dec. 20, 2007

Related U.S. Application Data

(63) Continuation of application No. PCT/US2005/045824, filed on Dec. 16, 2005.

(60) Provisional application No. 60/637,048, filed on Dec. 16, 2004.

(51) Int. Cl.
*H01M 8/06* (2006.01)
*C01B 3/08* (2006.01)
*C01B 13/02* (2006.01)
*C01B 31/20* (2006.01)

(52) U.S. Cl. ...... 429/421; 423/438; 423/579; 423/648.1

(58) Field of Classification Search .......... 423/648.1, 423/438, 579; 75/589, 745; 429/421
See application file for complete search history.

(56) References Cited

U.S. PATENT DOCUMENTS

| | | | |
|---|---|---|---|
| 497,700 A | 5/1893 | Blackmore | |
| 3,644,089 A * | 2/1972 | Minz et al. | 423/421 |
| 3,819,813 A * | 6/1974 | Jones, Jr. et al. | 423/421 |
| 3,927,192 A | 12/1975 | Bamberger et al. | |
| 3,929,979 A | 12/1975 | Bamberger et al. | |
| 3,929,980 A | 12/1975 | Abraham et al. | |
| 3,996,342 A | 12/1976 | Ishikawa et al. | |
| 4,169,884 A | 10/1979 | Bamberger et al. | |
| 4,237,105 A * | 12/1980 | Bamberger et al. | 423/306 |
| 4,276,279 A * | 6/1981 | Robinson et al. | 423/648.1 |
| 4,309,403 A * | 1/1982 | Robinson et al. | 423/579 |
| 4,313,925 A * | 2/1982 | Bamberger | 423/263 |
| 4,356,163 A * | 10/1982 | Davidson | 423/648.1 |
| 4,508,700 A * | 4/1985 | Hoshiko | 423/579 |
| 4,683,130 A * | 7/1987 | Ueno et al. | 423/579 |
| 6,994,839 B2 * | 2/2006 | Reichman et al. | 423/648.1 |
| 7,014,834 B2 * | 3/2006 | Lin et al. | 423/648.1 |
| 7,261,874 B2 * | 8/2007 | Lahoda et al. | 423/648.1 |
| 2004/0063567 A1 | 4/2004 | Ginosar et al. | |
| 2004/0202593 A1 | 10/2004 | Phillips et al. | |
| 2006/0013761 A1 * | 1/2006 | Lahoda et al. | 423/648.1 |

FOREIGN PATENT DOCUMENTS

| JP | 53-7595 | * | 1/1978 |
|---|---|---|---|
| JP | 55-67503 | * | 5/1980 |

* cited by examiner

OTHER PUBLICATIONS

C.A. Jacobson, Encyclopedia of Chemical Reactions, vol. VI, Reinhold Publishing Corporation (1956), pp. 253, 256, 314. (no month).*

*Primary Examiner* — Wayne Langel
(74) *Attorney, Agent, or Firm* — John P. O'Banion

(57) ABSTRACT

A novel thermochemical cycle for the decomposition of water is presented. Along with water, hydrogen, and oxygen, the cycle involves an alkali or alkali earth metal based process intermediate and a variety of reaction intermediates. The cycle is driven by renewable energy sources, and can have a maximum operating temperature below 1173 K (900° C.). The kinetics of the cycle are based on the reactant behavior as well as the separability characteristics of the chemicals involved.

18 Claims, 4 Drawing Sheets

HYDROGEN PRODUCTION BY A THERMOCHEMICAL WATER SPLITTING CYCLE

CROSS-REFERENCE TO RELATED APPLICATIONS

This application claims priority from, and is a 35 U.S.C. §111(a) continuation of, co-pending PCT international application serial number PCT/US2005/045824, filed on Dec. 16, 2005, incorporated herein by reference in its entirety, which claims priority from U.S. provisional application Ser. No. 60/637,048, filed on Dec. 16, 2004, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to the production of hydrogen from water, and more particularly to a thermochemical cycle using a renewable energy source that efficiently separates water into its components.

2. Description of Related Art

Hydrogen is mainly produced from natural gas through steam reforming and dry reforming of methane and other fossil fuels, and from coal through gasification. Hydrogen is also produced through electrolysis. These production methods consume fossil fuels, electricity, or both, and produce unwanted carbon dioxide as a byproduct. In addition, the hydrogen product usually requires separation from other by-products, such as carbon monoxide and carbon dioxide.

Thermal decomposition of water typically requires temperatures greater than 2273 K (about 2000° C.).

BRIEF SUMMARY OF THE INVENTION

The present invention provides a novel thermochemical cycle for the decomposition of water. Along with water, hydrogen, and oxygen, the cycle involves an alkali or alkali earth metal based catalyst and a variety of reaction intermediates. The cycle is driven by renewable energy sources, and can have a maximum operating temperature below 1173 K (900° C.). Alternatively, the cycle can operate at much higher temperatures. The kinetics of the cycle are based on the reactant behavior as well as the separability characteristics of the chemicals involved.

An aspect of the invention is a method, comprising using an alkali metal based or alkali earth metal based process intermediate in a thermochemical cycle for water splitting. In one embodiment, the thermochemical cycle operates in the absence of solids. In another embodiment, the thermochemical cycle operates at temperatures at or below about 1173 K.

Another aspect of the invention is a method for water splitting, comprising: introducing water into a system, introducing an alkali metal based or alkali earth metal based process intermediate into the system, separating the alkali metal based or alkali earth metal based process intermediate to produce reaction intermediates, reacting a subset of the reaction intermediates with water to produce hydrogen and hydroxide, combining a subset of the reaction intermediates with the hydroxide to produce water and oxygen, reforming the alkali metal based or alkali earth metal based process intermediate for continued use in the system, and removing the hydrogen and the oxygen from the system.

One embodiment further comprises removing heat from the system, and generating power, electricity, or both from the heat. In another embodiment, the generating step uses fuel cells or turbines to generate the power, electricity, or both.

A still further aspect of the invention is a system for water splitting, comprising: a plurality of interconnected reaction vessels, wherein the plurality of interconnected reaction vessels is configured to receive water from a source of water, wherein the plurality of interconnected reaction vessels is configured to admit an alkali metal based or alkali earth metal based process intermediate into the system, wherein water undergoes a series of thermochemical reactions with said alkali metal based or alkali earth metal based process intermediate, and wherein hydrogen and oxygen are recoverable from the system.

In one embodiment, the alkali metal based or alkali earth metal based process intermediate is combined with a transition metal. In other embodiments, the alkali metal based or alkali earth metal based process intermediate comprises a carbonate or a hydroxide, or comprises more than one type of alkali metal or alkali earth metal. In another embodiment, the system is operated in a polytropic manner. In another embodiment, the system operates at temperatures at or below about 1300 K. In still another embodiment, the system operates in the absence of solids within the system.

In yet another embodiment, heat generated by the series of thermochemical reactions is used to produce power, electricity, or both. In another embodiment, heat required for the series of thermochemical reactions is derived from solar or non-solar energy sources.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
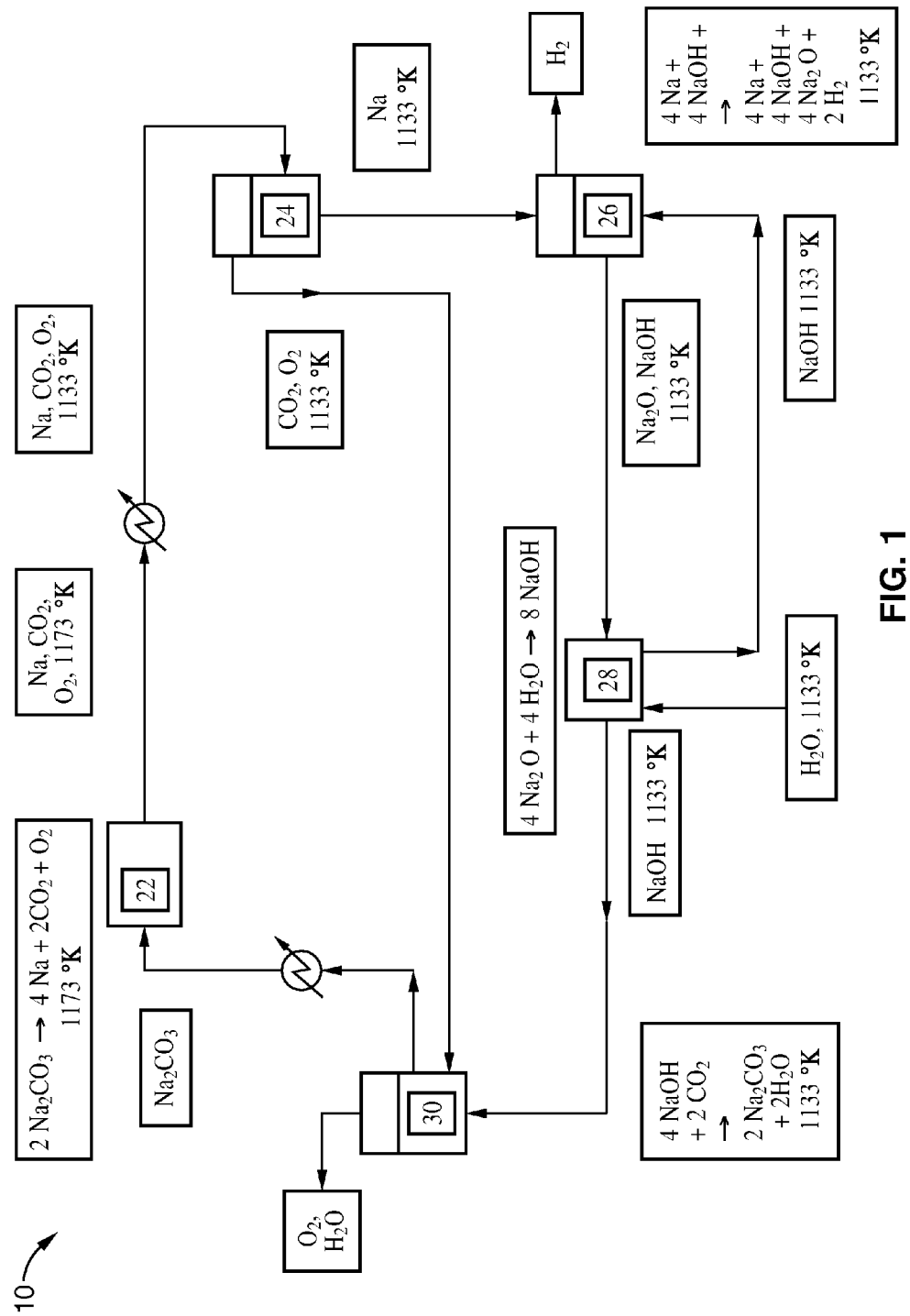
FIG. 1 is one embodiment of the thermochemical water splitting cycle according to the present invention.

Referring more specifically to the drawings, for illustrative purposes the present invention is embodied in the system generally shown in FIG. 1 through FIG. 5. It will be appreciated that the system may vary as to configuration and as to details of the parts, and that the method may vary as to the specific steps and sequence, without departing from the basic concepts as disclosed herein.

The overall water decomposition reaction is given by the equation:

$$2H_2O \rightarrow 2H_2 + 2O_2 \quad (1)$$

The present invention is a novel thermochemical cycle 10 that accomplishes the water decomposition reaction. The following examples detail various embodiments of the instant invention.

In each embodiment, temperatures shown are shown by way of example, and are not intended to limit the invention. The maximum operating temperature can be less than or equal to 1173 K, but operating temperatures in the range of 298 K to 1300 K are within the scope of the invention. The choice of operating temperature is driven by several factors, including capital costs for the reactors and associated material movement equipment, operating cost for the cycle, and costs related to available high temperature energy sources.

EXAMPLE 1

One embodiment of the thermochemical cycle can involve sodium, sodium bicarbonate, sodium carbonate, sodium hydride, sodium hydroxide, sodium monoxide, and carbon dioxide as intermediates.

$$2Na_2CO_3 \rightarrow 4Na + 2CO_2 + O_2 \quad (2)$$

$$4Na + 4NaOH \rightarrow 4Na_2O + 2H_2 \quad (3)$$

$$4Na_2O + 4H_2O \rightarrow 8NaOH \quad (4)$$

$$4NaOH + 2CO_2 \rightarrow 2Na_2CO_3 + 2H_2O \quad (5)$$

A process according to this embodiment is shown in FIG. 1.

Sodium carbonate is first placed in vessel 22 and heated. The sodium carbonate decomposes to a gaseous mixture of sodium, oxygen, and carbon dioxide. The gas mixture is then cooled to liquefy the sodium. The mixture enters vessel 24, where separation takes place. The sodium is sent to vessel 26, where it reacts to completion with sodium hydroxide (molten) to produce sodium monoxide and hydrogen (gas). The sodium monoxide is sent to vessel 28, where it is placed in contact with water to form sodium hydroxide.

Some of the sodium hydroxide from vessel 28 is recycled back to vessel 26 to react with the sodium and to facilitate transport of both heat and sodium monoxide. Some sodium hydroxide is also sent to vessel 30, where it is placed in contact with oxygen and carbon dioxide from vessel 24. The carbon dioxide is adjusted so that the reaction proceeds to completion to form sodium carbonate (molten). The molten sodium carbonate is then fed to vessel 22.

The heat produced in vessels 26 and 28, the heat from the exit streams containing hydrogen and oxygen, and the heat from the exit of reaction vessel 22 can be heat and power integrated with the heating needs of the system (e.g., heating of carbonate in and before vessel 22, heating of inlet water), and outside hot utilities (e.g., solar, nuclear, fossil fuel based, geothermal, etc.) and cold utilities (e.g., cooling water) to produce electricity.

EXAMPLE 2

Figure 2:
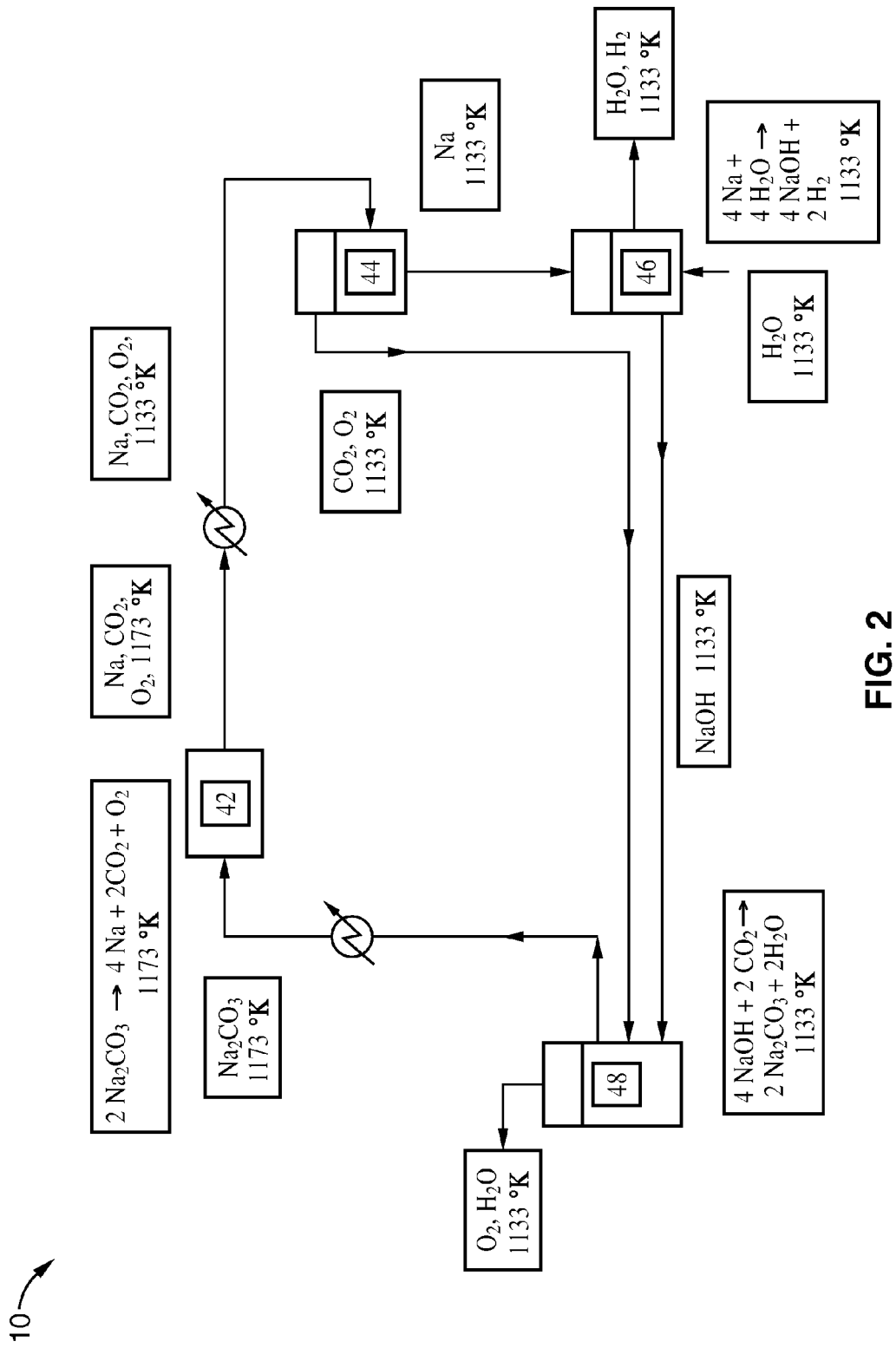
FIG. 2 is a second embodiment of the thermochemical water splitting cycle according to the present invention.

Another embodiment of the thermochemical cycle involves sodium, sodium carbonate, sodium hydroxide, and carbon dioxide as intermediates that help facilitate water decomposition. A process according to this embodiment is shown in FIG. 2.

$$2Na_2CO_3 \rightarrow 4Na + 2CO_2 + O_2 \quad (6)$$

$$4Na + 4H_2O \rightarrow 4NaOH + 2H_2 \quad (7)$$

$$4NaOH + 2CO_2 \rightarrow 2Na_2CO_3 + 2H_2O \quad (8)$$

The reactions can be carried out at a variety of temperatures. Reaction (6) is endothermic and can typically be carried out around 1173 K, where all its products are gases. Kinetic rate information at 1173 K is given in Hughes et al., "Production of the Boranes and Related Research", Academic Press, New York, 1967. Reaction (7) is exothermic and can be carried out at room temperature or even around 1133 K. Care must be taken to control the rate of reaction (7). This can be accomplished by running the reaction with excess steam. Reaction (8) is also exothermic and can be carried out around 1133 K. The choice of operating temperature for these reactions depends on several factors including capital costs for the reactors and reactors and associated material moving equipment, operating cost for the cycle, as well as the available high temperature energy source. Stable operation requires efficient heat removal from reactions (7) and (8).

Referring to FIG. 2, sodium carbonate is first placed in vessel 42 and heated. The sodium carbonate decomposes to a gaseous mixture of sodium, oxygen, and carbon dioxide. The gas mixture is then cooled to liquefy the sodium, and the mixture is sent to vessel 44, where separation takes place. The sodium is sent to vessel 46, where it reacts to completion with water (steam) to form sodium hydroxide (molten) and hydrogen (gas). Heat must be removed form vessel 46 to ensure stable operation. The sodium hydroxide is sent to vessel 48, where it is placed in contact with the oxygen and carbon dioxide from vessel 44. The carbon dioxide is adjusted so that the reaction proceeds to completion and forms sodium carbonate (molten). The molten sodium carbonate is then sent to vessel 42.

The heat from the reactions in vessels 46 and 48, the heat from the exit streams containing hydrogen and oxygen, and the heat from the exit of reaction vessel 42 can be heat and power integrated with the heating needs of the system (e.g., heating of carbonate in and before vessel 42, heating of inlet water), and outside hot utilities (e.g., solar, nuclear, fossil fuel based, geothermal, etc.) and cold utilities (e.g., cooling water) to produce electricity.

EXAMPLE 3

A third embodiment is given by the system of equations:

$$2Na_2CO_3 \rightarrow 4Na + 2CO_2 + O_2 \quad (9)$$

$$4Na + 4H_2O \rightarrow 4NaOH + 2H_2 \quad (10)$$

$$4NaOH + 4CO_2 \rightarrow 4NaHCO_3 \quad (11)$$

$$4NaHCO_3 \rightarrow 2Na_2CO_3 + 2H_2O + 4CO_2 \quad (12)$$

Figure 3:
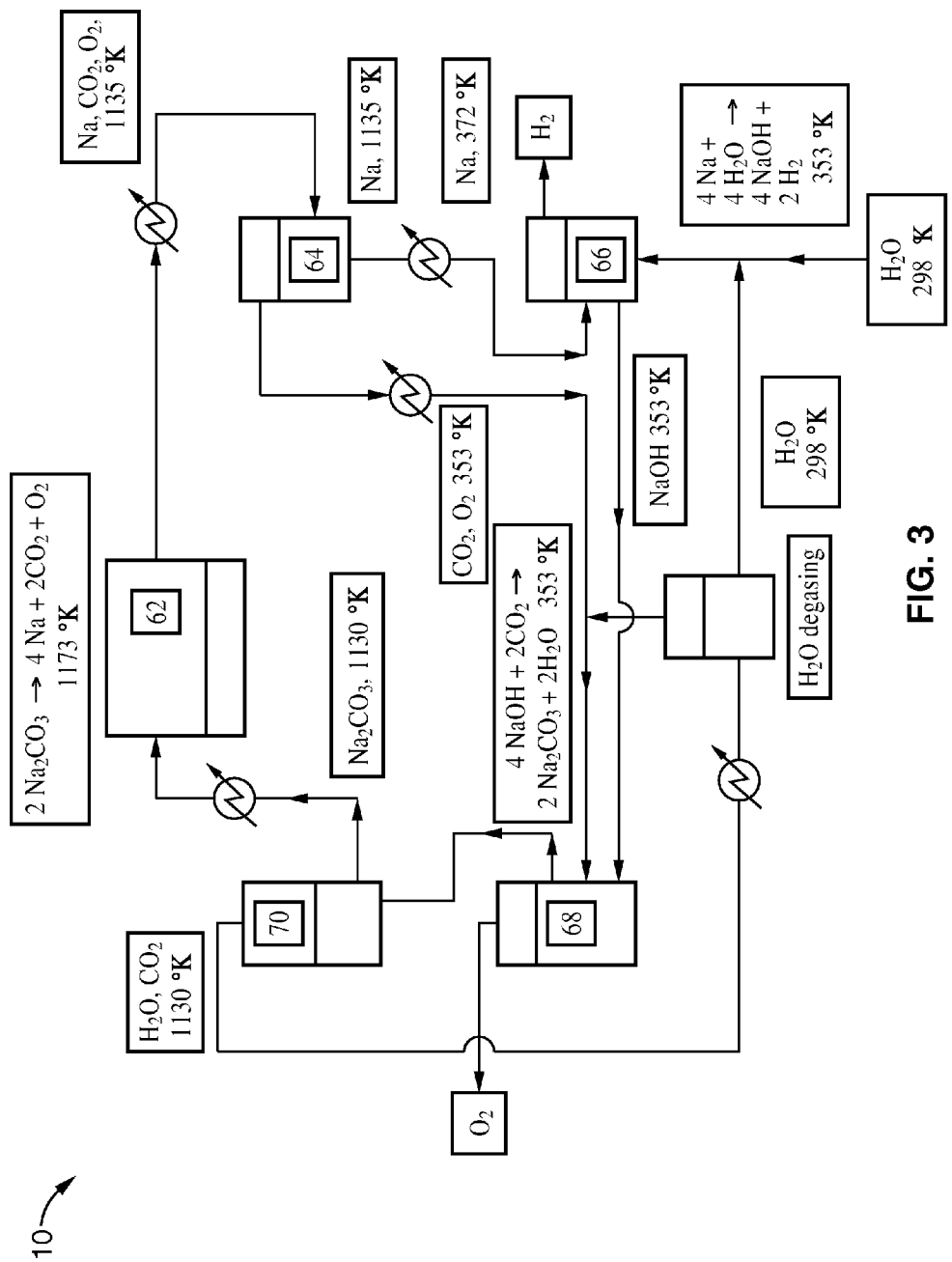
FIG. 3 is a third embodiment of the thermochemical water splitting cycle according to the present invention.

Referring to FIG. 3, sodium carbonate is first placed in vessel 62 and heated. The sodium carbonate decomposes to a gaseous mixture of sodium, oxygen, and carbon dioxide. The gas mixture is then cooled to liquefy the sodium, and the mixture is sent to vessel 64, where separation takes place. The sodium is cooled and sent to vessel 66, where it reacts to completion with water to form sodium hydroxide and hydrogen. Although FIG. 3 shows the reaction in vessel 66 with liquid water, the reaction can take place with liquid water or with steam. Heat must be removed from vessel 66 to ensure stable operation. The sodium hydroxide and some water are then sent to vessel 68, where it is placed in contact with the oxygen and carbon dioxide from vessel 64. The carbon dioxide is adjusted so that the hydroxide reacts to completion and forms sodium carbonate and sodium bicarbonate. The sodium bicarbonate and sodium carbonate solution is fed to vessel 70, where the bicarbonate decomposes to carbonate, water, and carbon dioxide, the water is vaporized, and the carbonate melts. The carbon dioxide and water gases are then separated and recycled, while the sodium carbonate is sent to vessel 62.

In each example, heat integration is possible, but not shown. All reaction vessels shown can be operated in an adiabatic or in a polytropic manner throughout the applicable temperature range. In addition, the process can be operated in a manner that avoids the presence and/or movement of solids anywhere in the cycle. Finally, although temperature-based separations are disclosed, other types of separations can be utilized according to the present invention.

EXAMPLE 4

Figure 4:
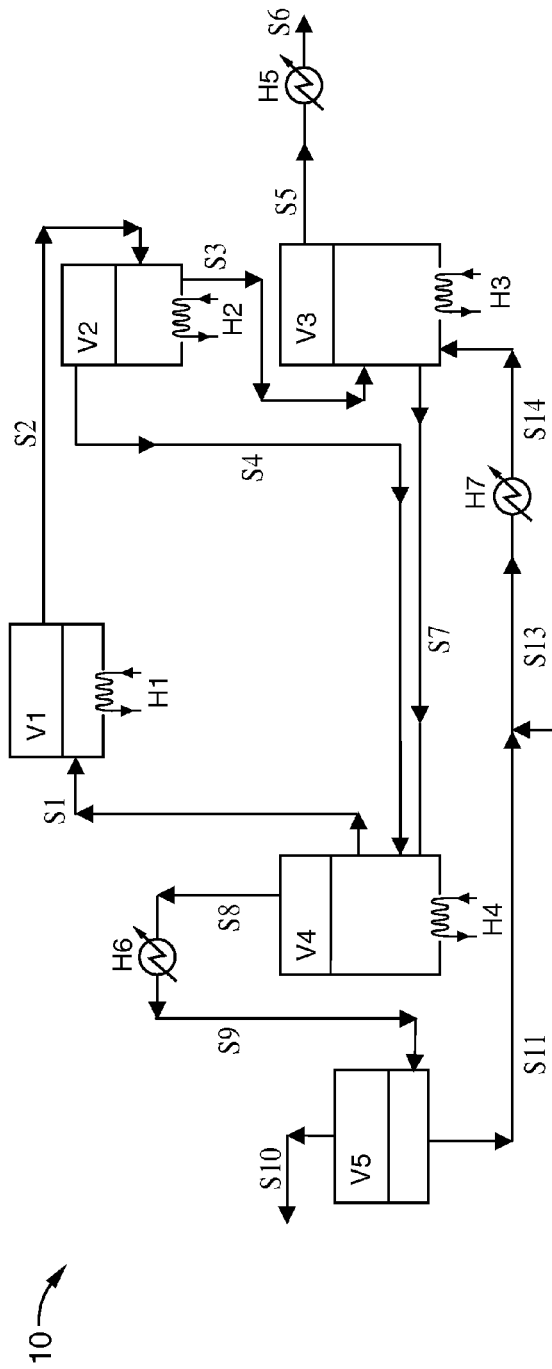
FIG. 4 is a thermochemical water splitting cycle associated with data in Tables 1-9.
Figure 5:
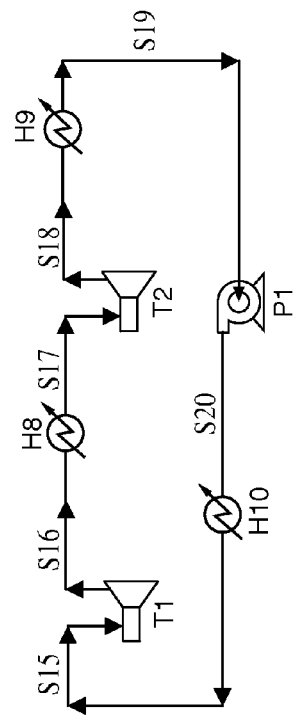
FIG. 5 is a steam cycle used in conjunction with the cycle of FIG. 4 to produce power and/or electricity.

FIG. 4 shows a thermochemical cycle utilizing reactions (2) through (5), much like that in FIG. 3. FIG. 5 is a standard reheat steam cycle associated with the cycle of FIG. 4. The data associated with the cycles shown in FIG. 4 and FIG. 5 are presented in Tables 1-9.

Tables 1A-1B show the characteristics of each stream shown in FIG. 4 and FIG. 5, including temperature, flow rate, and composition. Note that the composition of streams S15-S20 is water only, as these streams comprise the steam cycle.

Tables 2-4 provide thermodynamic data for the individual components at 1173 K, 1133 K, and 298 K, respectively.

Tables 5A-5B provide the operating conditions for each heat exchanger H1-H10, turbine T1-T2, and pump P1.

Table 6 indicates the heat load for the heat exchangers in the two systems, and Table 7 indicates the work load for the turbines and the pump.

Tables 8 and 9 quantify the cost coefficients ($/GJ) and the utility cost ($/s), respectively, for the cycle shown in FIG. 4 and FIG. 5. The value of the Hot Utility (HU) Cost for Groups 1-3 reflects the cost of natural gas. Fluctuations in the cost of natural gas will directly affect the cost efficiency of the cycle. For Group 4, the cost coefficient is zero, reflecting the use of solar power as the hot energy source. Note that the use of solar power realizes the greatest benefit in terms of cost. Table 9 also indicates the cost to produce hydrogen using the cycle of FIG. 4.

In the cycle shown in FIG. 4, sodium carbonate enters reaction vessel V1 as stream S1. In vessel V1, sodium carbonate is separated into sodium, oxygen, and carbon dioxide, which exits in stream S2. Stream S2 enters vessel V2. Sodium in separated out into stream S3, and enters vessel V3. Meanwhile, the carbon dioxide and oxygen from vessel V2 exit as stream S4, entering vessel V4.

Water enters the system at stream S12, and is also recycled from vessel V5. Streams S11, S13, S14 are composed of water, and are directed into vessel V3 to combine with the sodium from stream S3. Hydrogen is produced in vessel V3, and exits the system in streams S5, S6. Vessel V3 also produces sodium hydroxide, which enters vessel V4 via stream S7 and reacts with the carbon dioxide and oxygen from stream S4.

The reaction in vessel V4 produces sodium carbonate, which is routed back to vessel V1 via stream S1. The reaction in vessel V4 also produces water and oxygen, which enters vessel V5 through stream S9. Oxygen exits the system through stream S10, and the water is recycled to vessel V3 by way of streams S11, S13, S14.

FIG. 5 shows a standard reheat steam cycle utilizing streams S15-S20, which generates power or electricity from a thermochemical cycle such as that shown in FIG. 4. Heat exchangers H8 and H10 pick up energy from heat exchangers H2, H3, H4, H5, H6, shown in FIG. 4, and utilize turbines T1 and T2 to generate power and/or electricity. Note that the heat load, shown in Table 6, for H8+H10 is equal in magnitude to that of H2+H3+H4+H5+H6.

The steam cycle shown in FIG. 5 is intended only as an example, and other elements may be used to achieve similar or better results. For example, fuel cells can be utilized instead of turbines for energy generation.

FIGS. 4 and 5, and their associated data, represent one example of the use of the present invention and does not represent the maximum system efficiency possible. Other embodiments of the present invention could achieve efficiencies of 75-80%.

Other systems of equations can be generated that involve the same intermediates. In addition, other alkali metals and alkali earth metals can be used in place of sodium. Finally, mixtures of these metals, their carbonates, and/or their hydroxides can be used according to the present invention, as can combinations of these materials with transition metals.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1-A

| | Stream # | | | | | | | | | |
|---|---|---|---|---|---|---|---|---|---|---|
| | 1 | 2 | 3 | 4 | 5 | 6 | 7 | 8 | 9 | 10 |
| Flow (mol/s) | 1 | 3.5 | 2 | 1.5 | 1 | 1 | 2 | 1.5 | 1.5 | 0.5 |
| Pressure (kPa) | 101.3 | 101.3 | 101.3 | 101.3 | 101.3 | 101.3 | 101.3 | 101.3 | 101.3 | 101.3 |
| Temperature (°K) | 1133 | 1173 | 1133 | 1133 | 1133 | 298 | 1133 | 1133 | 298 | 298 |
| $H_2O$ (mol/s) | 0 | 0 | 0 | 0 | 0 | 0 | 0 | 1 | 1 | 0 |
| $H_2$ (mol/s) | 0 | 0 | 0 | 0 | 1 | 1 | 0 | 0 | 0 | 0 |
| $O_2$ (mol/s) | 0 | 0.5 | 0 | 0.5 | 0 | 0 | 0 | 0.5 | 0.5 | 0.5 |
| Na (mol/s) | 0 | 2 | 2 | 0 | 0 | 0 | 0 | 0 | 0 | 0 |
| NaOH (mol/s) | 0 | 0 | 0 | 0 | 0 | 0 | 2 | 0 | 0 | 0 |
| $Na_2CO_3$ (mol/s) | 1 | 0 | 0 | 0 | 0 | 0 | 0 | 0 | 0 | 0 |
| $CO_2$ (mol/s) | 0 | 1 | 0 | 1 | 0 | 0 | 0 | 0 | 0 | 0 |
| H (kJ/s) | 100.9963 | 92.01492 | 32.6428 | 54.76664 | 25.16037 | −0.00431 | 99.38876 | 33.44491 | −12.1357 | −0.00196 |
| H (kJ/s) (Hysys) | | | | | | | | | | |
| Phase | Liquid | Vapor | Liquid | Vapor | Vapor | Vapor | Liquid | Vapor | Liquid/Vapor | Vapor |

TABLE 1-B

| | Stream # | | | | | | | | | |
|---|---|---|---|---|---|---|---|---|---|---|
| | 11 | 12 | 13 | 14 | 15 | 16 | 17 | 18 | 19 | 20 |
| Flow (mol/s) | 1 | 1 | 2 | 2 | 0 | 0 | 0 | 0 | 0 | 0 |
| Pressure (kPa) | 101.3 | 101.3 | 101.3 | 101.3 | 25330 | 1818 | 1818 | 2.55 | 2.55 | 25330 |
| Temperature (°K) | 298 | 298 | 298 | 1133 | 873.15 | 481.65 | 1011.15 | 295.2 | 294.99 | 295.26 |
| $H_2O$ (mol/s) | 1 | 1 | 2 | 2 | 0 | 0 | 0 | 0 | 0 | 0 |
| $H_2$ (mol/s) | 0 | 0 | 0 | 0 | 0 | 0 | 0 | 0 | 0 | 0 |
| $O_2$ (mol/s) | 0 | 0 | 0 | 0 | 0 | 0 | 0 | 0 | 0 | 0 |
| Na (mol/s) | 0 | 0 | 0 | 0 | 0 | 0 | 0 | 0 | 0 | 0 |
| NaOH (mol/s) | 0 | 0 | 0 | 0 | 0 | 0 | 0 | 0 | 0 | 0 |
| $Na_2CO_3$ (mol/s) | 0 | 0 | 0 | 0 | 0 | 0 | 0 | 0 | 0 | 0 |
| $CO_2$ (mol/s) | 0 | 0 | 0 | 0 | 0 | 0 | 0 | 0 | 0 | 0 |
| H (kJ/s) | −12.1338 | −12.1338 | −24.2676 | 39.28542 | 0 | 0 | 0 | 0 | 0 | 0 |
| H (kJ/s) (Hysys) | | | | | 0 | 0 | 0 | 0 | 0 | 0 |
| Phase | Liquid | Liquid | Liquid | Vapor | Vapor | Vapor | Vapor | Vapor | Liquid | Liquid |

TABLE 2

| | T °K (298.15-1300) 1173 | | | | | | | |
|---|---|---|---|---|---|---|---|---|
| | $CO_2$ | $H_2$ | $H_2O$ | $O_2$ | Na | $Na_2CO_3$ | NaOH | $CH_4$ |
| Melting Point °K | 216.55 | 13.95 | 273.15 | 54.25 | 371 | 1127 | 595 | 90.65 |
| Boiling Point °K | 194.65 | 20.45 | 373.15 | 90.15 | 1154.5 | 1300 | 1651 | 111.75 |
| ΔH° f (kcal/mol) | −94.052 | 0 | −68.3174 | 0 | 0 | −269.46 | −101.96 | −17.889 |
| ΔG° f (kcal/mol) | −94.26 | 0 | −56.6899 | 0 | 0 | −249.55 | −90.06 | −12.14 |
| $ΔH_f$ (cal/mol) | 1900 | 28 | 1436 | 106 | 630 | 7000 | 2000 | 224 |
| $ΔH_v$ (cal/mol) | 6030 | 216 | 9729 | 1629 | 23120 | | | 2040 |
| Cps (cal/mol °K) | | | | | | 11.29728 | 28.9 | 14.22 |
| Cpl (cal/mol °K) | | | 18 | | 7.5 | 28.9 | 14.22 | |
| Cpg (cal/mol °K) | 13.41193 | 7.57013 | 11.82324 | 8.436217 | 4.97 | | 18.8295 | |
| H (T) (kcal/mol) | −83.7319 | 6.312756 | −49.8732 | 6.931505 | 30.21382 | −237.177 | −87.5196 | −5.81685 |

TABLE 3

| | T °K (298.15-1300) 1133 | | | | | | | |
|---|---|---|---|---|---|---|---|---|
| | $CO_2$ | $H_2$ | $H_2O$ | $O_2$ | Na | $Na_2CO_3$ | NaOH | $CH_4$ |
| Melting Point °K | 216.55 | 13.95 | 273.15 | 54.25 | 371 | 1127 | 595 | 90.65 |
| Boiling Point °K | 194.65 | 20.45 | 373.15 | 90.15 | 1154.5 | 1300 | 1651 | 111.75 |
| ΔH° f (kcal/mol) | −94.052 | 0 | −68.3174 | 0 | 0 | −269.46 | −101.96 | −17.889 |
| ΔG° f (kcal/mol) | −94.26 | 0 | −56.6899 | 0 | 0 | −249.55 | −90.06 | −12.14 |
| $ΔH_f$ (cal/mol) | 1900 | 28 | 1436 | 106 | 630 | 7000 | 2000 | 224 |
| $ΔH_v$ (cal/mol) | 6030 | 216 | 9729 | 1629 | 23120 | | | 2040 |
| Cps (cal/mol °K) | | | | | | 11.08288 | 28.9 | 14.22 |
| Cpl (cal/mol °K) | | | 18 | | 7.5 | 28.9 | 14.22 | |

TABLE 3-continued

T °K (298.15-1300) 1133

|  | $CO_2$ | $H_2$ | $H_2O$ | $O_2$ | Na | $Na_2CO_3$ | NaOH | $CH_4$ |
|---|---|---|---|---|---|---|---|---|
| Cpg (cal/mol °K) | 13.29212 | 7.53773 | 11.63964 | 8.416095 | 4.97 |  |  | 18.3695 |
| H (T) (kcal/mol) | −84.2659 | 6.010599 | −50.2802 | 6.594456 | 6.840622 | −238.333 | −88.0884 | −6.56083 |

TABLE 4

T °K (298.15-1300) 298

|  | $CO_2$ | $H_2$ | $H_2O$ | $O_2$ | Na | $Na_2CO_3$ | NaOH | $CH_4$ |
|---|---|---|---|---|---|---|---|---|
| Melting Point °K | 216.55 | 13.95 | 273.15 | 54.25 | 371 | 1127 | 595 | 90.65 |
| Boiling Point °K | 194.65 | 20.45 | 373.15 | 90.15 | 1154.5 | 1300 | 1651 | 111.75 |
| ΔH° f (kcal/mol) | −94.052 | 0 | −68.3174 | 0 | 0 | −269.46 | −101.96 | −17.889 |
| ΔG° f (kcal/mol) | −94.26 | 0 | −56.6899 | 0 | 0 | −249.55 | −90.06 | −12.14 |
| $\Delta H_f$ (cal/mol) | 1900 | 28 | 1436 | 106 | 630 | 7000 | 2000 | 224 |
| $\Delta H_v$ (cal/mol) | 6030 | 216 | 9729 | 1629 | 23120 |  |  | 2040 |
| Cps (cal/mol °K) |  |  |  |  | 6.60728 | 28.9 | 14.22 |  |
| Cpl (cal/mol °K) |  |  | 18 |  | 7.5 | 28.9 | 14.22 |  |
| Cpg (cal/mol °K) | 8.955043 | 6.86138 | 8.785997 | 6.23324 | 4.97 |  |  | 8.767 |
| H (T) (kcal/mol) | −94.0533 | −0.00103 | −68.3201 | −0.00094 | −0.00099 | −269.464 | −101.962 | −17.8903 |

TABLE 5-A

| Unit | H1 | H2 | H3 | H4 | H5 | H6 | H7 | H8 | H9 | H10 |
|---|---|---|---|---|---|---|---|---|---|---|
| Temperature IN (°K) | 1173 | 1133 | 1133 | 1133 | 1133 | 1133 | 298 | 481.65 | 295.2 | 295.26 |
| Temperature OUT (°K) | 1173 | 1133 | 1133 | 1133 | 298 | 298 | 1133 | 1011.15 | 294.99 | 873.15 |
| Q (kJ/s) | 914.6174 | −198.622 | −348.64 | −117.92 | −25.1647 | −89.3193 | 151.0303 | 199.4494 | −426.574 | 580.2165 |
| Q/ΔT (kJ/(°K*s)) |  |  |  |  | 0.030137 | 0.106969 | 0.180875 | 0.376675 | 2031.303 | 1.004026 |
| W (kJ/s) |  |  |  |  |  |  |  |  |  |  |

TABLE 5-B

| Properties | Unit | | |
|---|---|---|---|
|  | T1 | T2 | P1 |
| Temperature IN (°K) | 873.15 | 1011.15 | 294.99 |
| Temperature OUT (°K) | 481.65 | 295.2 | 295.26 |
| Q (kJ/s) |  |  |  |
| Q/ΔT (kJ/(°K*s)) |  |  |  |
| W (kJ/s) | −105.928 | −251.936 | 4.771517 |

TABLE 6

| Heat Loads (kJ/s) |  |  |
|---|---|---|
|  | 9.543035 | ← flow |
| H2 + H3 + H4 + H5 + H6 | −779.666 |  |
| H1 + H7 | 1065.648 |  |
| H8 + H10 | 779.666 |  |
| H9 | −426.574 |  |

TABLE 7

| Work Loads (kJ/s) |  |
|---|---|
| T1 + T2 | −357.864 |
| P1 | 4.771517 |

TABLE 8

| Cost Coeffs ($/GJ) | Group 1 | Group 2 | Group 3 | Group 4 |
|---|---|---|---|---|
| Hot Utility Cost ($/GJ) | 8.825 | 8 | 9.298 | 0 |
| Cold Utility Cost ($/GJ) | 0.5 | 0.5 | 1.85 | 1.85 |
| Electricity Cost ($/GJ) | 25.3 | 26 | 23.8889 | 23.8889 |

TABLE 9

| Utility Costs ($/s) | Group 1 | Group 2 | Group 3 | Group 4 |
|---|---|---|---|---|
| HU Cost ($/s)*10^3 | 9.404341 | 8.525182 | 9.908393 | 0 |
| CU Cost ($/s)*10^3 | 0.213287 | 0.213287 | 0.789161 | 0.789161 |
| E Cost ($/s)*10^3 | −8.93324 | −9.1804 | −8.43499 | −8.43499 |
| Total Cost ($/s)*10^3 | 0.684393 | −0.44193 | 2.262567 | −7.64583 |
| $H_2$ Cost ($/kg $H_2$) | 0.342197 | −0.22097 | 1.131284 | −3.82291 |

What is claimed is:

1. A method for hydrogen, oxygen and heat production, comprising:
   thermally decomposing an alkali metal carbonate or an alkali earth metal carbonate to produce a gaseous metal, carbon dioxide and oxygen;
   liquefying the gaseous metal to a liquid metal;
   reacting said liquid metal with a hydroxide to produce a metal oxide and hydrogen;
   reacting the metal oxide with water to produce a metal hydroxide;
   reacting some of said metal hydroxide with carbon dioxide to recover metal carbonate for use with said thermally decomposing step;

recovering some of said metal hydroxide for use with said reacting said liquid metal step; and
recycling the recovered metal carbonate and the metal hydroxide;
recovering said hydroxide and said metal carbonate; and
recycling said metal carbonate for use with said thermal decomposition step and said hydroxide for use with said reaction with metal step,
wherein recycling of said metal carbonate and said hydroxide permit continuous production.

2. A method as recited in claim 1, wherein said hydroxide comprises water.

3. A method as recited in claim 1, wherein said hydroxide comprises sodium hydroxide.

4. A method as recited in claim 1, wherein said alkali metal based carbonate or alkali earth metal carbonate comprises a combination of more than one category of alkali metal carbonate or alkali earth metal carbonate.

5. A method as recited in claim 1, wherein said alkali metal based carbonate or alkali earth metal carbonate comprises sodium bicarbonate and said hydroxide comprises sodium hydroxide.

6. A method as recited in claim 1, wherein the said thermal decomposition of said metal carbonate takes place in temperatures ranging from 298° K to 1300° K.

7. A method as recited in claim 1, wherein the said thermal decomposition of said metal carbonate takes place in temperatures at approximately 1173° K.

8. A method as recited in claim 1, wherein the thermochemical cycle operates in the absence of solids.

9. A method as recited in claim 1, further comprising:
performing said decomposition and reactions within a closed system;
removing heat produced from said system; and
generating power, electricity, or both, from said heat.

10. A method as recited in claim 9, wherein the generating step uses fuel cells or turbines to generate said power, electricity, or both.

11. A method for hydrogen, oxygen and heat production, comprising:
thermally decomposing an alkali metal carbonate or an alkali earth metal carbonate to produce a gaseous metal, carbon dioxide and oxygen within a system;
liquefying the gaseous metal to a liquid metal;
separating said liquid metal from the produced carbon dioxide and oxygen;
reacting said liquid metal with water to produce a metal hydroxide and hydrogen;
removing said hydrogen;
recovering said metal carbonate from said metal hydroxide;
reacting the metal hydroxide with carbon dioxide to recover the metal carbonate;
removing heat from said system; and
recycling said recovered metal carbonate for thermal decomposition.

12. A method as recited in claim 11, wherein said metal carbonate is recovered from said metal hydroxide using the carbon dioxide and oxygen produced from the initial thermal decomposition of alkali metal or alkali earth carbonate.

13. A method as recited in claim 11, wherein the said thermal decomposition of said metal carbonate takes place in temperatures ranging from 298° K to 1300° K.

14. A method as recited in claim 11, wherein the said thermal decomposition of said metal carbonate takes place in temperatures at approximately 1173° K.

15. A method for hydrogen, oxygen and heat production, comprising:
thermally decomposing one or more alkali metal carbonates or one or more alkali earth metal carbonates to produce one or more gaseous metals, carbon dioxide and oxygen within a system;
liquefying the gaseous metals into liquid metals;
separating said liquid metals from the produced carbon dioxide and oxygen;
reacting said liquid metals with water to produce metal hydroxides and hydrogen;
removing said hydrogen;
recovering alkali metal or alkali earth metal carbonates from said metal hydroxides by reacting them with the carbon dioxide and oxygen produced from the initial thermal decomposition of said alkali metal or alkali earth carbonates; and
recycling said recovered alkali metal or alkali earth metal carbonates for thermal decomposition.

16. A method as recited in claim 15, further comprising:
removing heat from said system; and
generating power, electricity, or both, from said heat.

17. A method as recited in claim 16, wherein the generating step uses fuel cells or turbines to generate said power, electricity, or both.

18. A method as recited in claim 15, wherein said thermal decomposition of said metal carbonate takes place in temperatures ranging from 298° K to approximately 1300° K.

* * * * *